(12) United States Patent
Dube et al.

(10) Patent No.: US 6,782,143 B1
(45) Date of Patent: Aug. 24, 2004

(54) METHOD AND APPARATUS FOR PROCESSING AN IMAGE

(75) Inventors: Simant Dube, San Diego, CA (US); Li Hong, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/476,221

(22) Filed: Dec. 30, 1999

(51) Int. Cl.$^7$ .............................. G06K 9/32; G01V 3/00
(52) U.S. Cl. ........................ 382/300; 382/298; 324/309
(58) Field of Search ................................. 382/300, 256, 382/278, 298; 324/309; 348/581; 358/1.9, 451, 462; 708/290

(56) References Cited

U.S. PATENT DOCUMENTS

| | | | |
|---|---|---|---|
| 5,048,105 A | 9/1991 | Adachi | 382/300 |
| 5,577,132 A | 11/1996 | Yokose et al. | 382/238 |
| 5,644,232 A * | 7/1997 | Smith | 324/309 |
| 5,654,737 A | 8/1997 | Der et al. | 345/634 |
| 5,659,370 A | 8/1997 | Mancuso et al. | 348/620 |
| 5,680,179 A | 10/1997 | D'Alto et al. | 348/607 |
| 5,729,357 A | 3/1998 | Funada et al. | 358/451 |
| 5,751,860 A | 5/1998 | Su et al. | 382/244 |
| 5,828,789 A | 10/1998 | Yokose et al. | 382/239 |
| 5,859,931 A | 1/1999 | Fan et al. | 382/238 |
| 5,889,562 A | 3/1999 | Pau | 348/447 |
| 5,903,671 A | 5/1999 | Toda | 382/236 |
| 5,920,660 A | 7/1999 | Goto | 382/300 |
| 5,929,918 A | 7/1999 | Marques Pereira | 348/448 |
| 5,953,465 A | 9/1999 | Saotome | 382/300 |
| 5,960,116 A | 9/1999 | Kajiwara | 382/238 |
| 5,963,678 A | 10/1999 | Nozawa | 382/299 |
| 5,970,169 A | 10/1999 | Ittner | 382/160 |
| 5,999,656 A | 12/1999 | Zandi et al. | 382/248 |
| 6,157,749 A * | 12/2000 | Miyake | 382/300 |

FOREIGN PATENT DOCUMENTS

| | | | |
|---|---|---|---|
| EP | 0 863 484 A2 | 9/1998 | G06T/3/40 |
| EP | 0 863 655 A1 | 9/1998 | H04N/5/14 |

OTHER PUBLICATIONS

Hong et al., "An Edge Preserving Image Interpolation System for a Digital Camcorder" IEEE Transactions On Consumer Electronics, vol. 42, No. 3, Aug. 1996, pp. 279–284.

Akeley and Jermoluk, "High Performance Polygon Rendering" Computer Graphics, vol. 22, No. 4, Aug. 1988, pp. 239–245.

Voorhies et al., "Virtual Graphics" Computer Graphics, vol. 22, No. 4, Aug. 1988, pp. 247–253.

Xiaolin Wu, "Context–Based, Adaptive, Lossless Image Coding" IEEE Transactions on Communications, vol. 45, No. 4, Apr. 1997, pp. 437–444.

(List continued on next page.)

*Primary Examiner*—Anh Hong Do
(74) *Attorney, Agent, or Firm*—Lisa K. Jorgenson; James H. Morris

(57) ABSTRACT

In a first aspect, a method and an apparatus for processing an image classifies the image content of a portion of the image, and in response thereto, selects between linear interpolation (e.g., cubic) and non-linear interpolation (median) methods to interpolate data points for the portion of the image. In one embodiment, non-linear interpolation is selected if the image content of the portion of the image is bi-level, or if portion of the image includes an edge and lacks a specified measure of correlation along a line. Linear interpolation is used in portions where the image content does not include an identified edge and in portions where there is an identified edge in combination with an identified edge direction or a path of isobrightness. In a second aspect, a method and apparatus for use in classifying the image content of a portion of an image calculates a reference value from pixel values for a portion of an image and generates data indicative of which pixel values are greater than the reference value and which pixel values are less than the reference value.

17 Claims, 16 Drawing Sheets

OTHER PUBLICATIONS

Xiaolin Wu, "High–Order Context Modeling and Embedded Conditional Entropy Coding of Wavelength Coefficients for Image Compression", downloaded from website www.csd.uwo.ca/faculty/wu/ (ECECOW).

Queiroz et al., "Nonexpansive Pyramid for Image Coding Using A Nonlinear Filterbank" IEEE Transactions On Image Processing, vol. 7, No. 2, Feb. 1998, pp. 246–252.

Morris Goldberg, "Comparative Performance of Pyramid Data Structures for Progressive Image Transmission", IEEE Transactions on Communications, vol. 39, No. 4, Apr. 1991, pp. 540–548.

Seemann et al., "Generalized Locally Adaptive DPCM", Technical Report No. 97/301, Monash University, Mar. 1997, 15pp., downloaded from website www.csse.monash.edu.au/~torsten/publications.shtml (No. 1).

Claypoole, Jr. et al., "Nonlinear Wavelet Transforms for Image Coding via Lifting" submitted to IEEE Transactions on Image Processing, 1999 (Aug.), downloaded from website cm.bell–labs.com/who/wim/ (Papers 4 Lifting).

Brian Apgar et al., "A Display System for the Stellar™ Graphics Supercomputer Model GS1000™" Computer Graphics, vol. 22, No. 4, Aug. 1988, pp. 255–288.

Alain Fournier et al., "Constant–Time Filtering with Space–Variant Kernels" Computer Graphics, vol. 22, No. 4, Aug. 1988, pp. 229–238.

Alex D. Kelley et al., "Terrain Simulation Using a Model of Stream Erosion" Computer Graphics, vol. 22, No. 4, Aug. 1988, pp. 263–268.

Demetri Terzopoulos et al., "Modeling Inelastic Deformation: Viscoelasticity, Plasticity, Fracture" Computer Graphics, vol. 22, No. 4, Aug. 1988, pp. 269–278.

John C. Platt et al., "Constraint Methods for Flexible Models" Computer Graphics, vol. 22, No. 4, Aug. 1988, pp. 279–288.

Printout of list of research and selected publications by Xiaolin Wu downloaded from website www.csd.uwo.ca/faculty/wu/ (ECECOW).

* cited by examiner

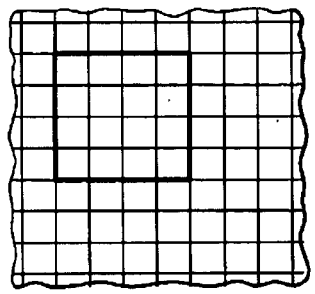
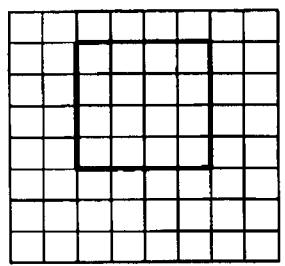
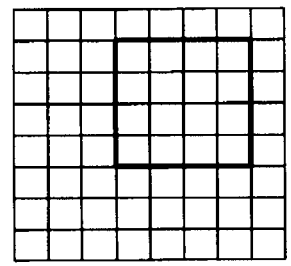
FIG. 3A  FIG. 3B  FIG. 3C
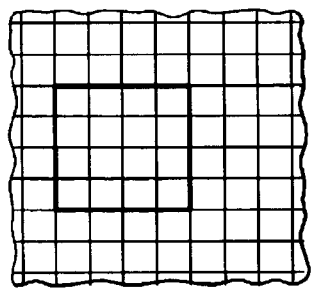
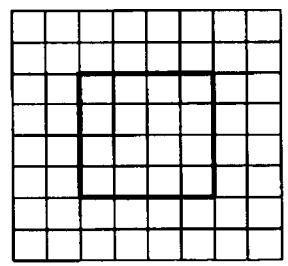
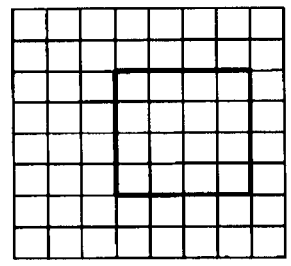
FIG. 3D  FIG. 3E  FIG. 3F

FIG. 4

|  | Ⓒ | Ⓓ Ⓔ |
|---|---|---|
| Bilevel Rule 5 | Cubic1(E,F,G,H) If strong horizontal edge | Cubic1(B,F,J,N) If strong vertical edge | Cubic1(A,F,K,P) If strong 135 degree edge |
| | | | Cubic1(D,G,J,M) If strong 45 degree edge |
| Rule 6 | F If F and G have same greyness value | F If F and J have same greyness value | MODE(F,G,J,K) |
| Rule 7 | MODE(F,G,(MODE(F,G,J,K)) If F and G do not have same greyness value | MODE(F,J,MODE(E,F,I,J)) If F and J do not have same greyness value | |

Where: Cubic1(A,B,C,D)=(−A+9B+9C−D)/16
Cubic2(A,B,C,D)=(−2A+10B+10C−2D)/16
Median(A,B,C,D)=(A+B+C+D−max(A,B,C,D)−min(A,B,C,D))
Mode(A,B,C,D)=most frequently occurring value among A B C D. If two values are equally frequent then break tie in favor of foreground

FIG. 11B

METHOD AND APPARATUS FOR PROCESSING AN IMAGE

BACKGROUND OF THE INVENTION

It is known to enlarge images, such as for example, when zooming in on a region of an image to make it easier to see the detail within the region. In doing so, it is desirable for the image content of the enlarged image to be as sharp, or sharper than, that of the original image. In consideration thereof, an enlargement is not generated by merely magnifying the original image, because the sharpness of the enlarged image would be recognized to be lower than the sharpness of the original image. Rather an enlargement is typically formed from a combination of original image data and interpolated image data.

Various methods have been proposed for generating interpolated image data. Nearest neighbor and linear interpolation of first, second or third order are simple and popular methods. Conceptually, these methods typically have two stages: (1) fit an interpolating function to the data points of the original image. (2) evaluate the interpolating function at one or more points between the data points of the original image. Linear interpolation can be viewed as using a weighted average wherein the greatest weight is given to the pixels nearest the pixel being interpolated. In cases where the data points are disposed in a line, the interpolation is sometimes said to be carried out along the line, or in a direction of that line. However the above methods often introduce artifacts that blur and/or introduce rings around edges, i.e., boundaries, such as for example, between light and dark regions in the image. This is particularly true in cases where the pixel to be interpolated is near an edge and the interpolation is not carried out parallel to the edge.

Other interpolation methods include improved B-spline methods, Bayesian methods, segmentation, and frequency space extrapolation. Still further methods include non-linear interpolation, e.g., median interpolation. Median interpolation is frequently used for text images, which are typically bi-level (binary), i.e., having exactly two levels of greyness (typically black and white). When dealing with bi-level text images, it is generally desirable to preserve the bi-level quality of the images. Trying to use linear interpolation on a bi-level text image is difficult at best, and at worst, results in blurring of the edges in the image.

Adaptive interpolation methods have also been developed. Adaptive interpolation methods analyze the image content of portions of an image, and base the interpolation for each portion upon the image content of the portion.

SUMMARY

Adaptive interpolation methods that select and/or adapt one or more types of linear interpolation to each portion of an image are known. However, the effectiveness of these adaptive methods depends on their ability to select and/or adopt linear interpolation methods to each situation that may arise.

It has been observed that even if an image is not entirely bi-level, there are often advantages to using non linear interpolation for some portion of the image. For example, the image may have one or more portions that are bi-level. To help keep the image sharp, it may be desirable to detect such portions and interpolate therein using non linear interpolation rather than linear interpolation. It should be understood that a bi-level image need not be a text image. As another non limiting example, it may be desirable to use non-linear interpolation rather than linear interpolation for some portions that contain edges, for example, where the portion has an edge and the direction of the edge is either unidentified or off-line from a direction that would otherwise be used to linearly interpolate.

Thus, one object of one aspect of the present invention is to provide an adaptive interpolation apparatus and method that selects between linear and non-linear interpolation.

In accordance with a first aspect of the present invention, a method and an apparatus for processing an image classifies the image content of a portion of the image, and in response thereto, selects between linear and non-linear interpolation methods to interpolate data points for the portion of the image.

According to one embodiment of the invention, the linear interpolation comprises polynomial interpolation, preferably of third order, i.e., cubic.

According to another embodiment of the invention, the non-linear interpolation comprises medial and/or modal interpolation.

According to another embodiment of the invention, the method and apparatus determines whether the image content of the portion of the image is bi-level, i.e., binary, and if so, selects non-linear interpolation.

According to another embodiment of the invention, the method and apparatus determines whether the image content of the portion of the image includes an edge and lacks a specified measure of correlation along a line, and if so, selects non-linear interpolation to interpolate a value of a pixel disposed on the line.

The adaptive method employed by the present invention may help to keep the image sharp thereby helping to retain the detail of the image. The invention may also help to avoid introduction of unwanted artifacts. While the invention does not require specialized hardware, an embodiment with specialized hardware could speed execution. Furthermore, because the adaptive method of the present invention has the ability to select non-linear interpolation for a portion of the image, the types of linear interpolation employed by the adaptive need not be as complex (and therefore may be faster and easier to execute than otherwise be required), although this depends on the embodiment and is not intended as a limitation of the present invention in any way, shape or form.

In another embodiment, the method and apparatus are used in an image enlarging system. The image enlarging system uses non-linear interpolation in portions of an image where the image content is bi-level and in portions where image content includes an edge but there is no identified edge direction or path of isobrightness. The image enlarging system uses linear interpolation in portions where the image content does not include an identified edge and in portions where there is an identified edge in combination with an identified edge direction or a path of isobrightness. The present invention may of course also be used in other embodiments of image enlarging systems.

In some embodiments, the method and apparatus may be used in digital cameras, printers, and monitors.

In another embodiment, the method and apparatus may be used to process video frames.

In another embodiment, the method and apparatus may be used for upsampling in a image compression system having hierarchical coding.

In a second aspect of the present invention, a method and apparatus for use in classifying the image content of a portion of an image calculates a reference value from pixel values for a portion of an image and generates data indicative of which pixel values are greater than the reference value and which pixel values are less than the reference value.

This aspect of the invention may be used in conjunction with the first aspect of the invention, but is not limited to such.

These and other objects, features and advantages of the present invention will be apparent in view of the drawings, description and claims hereinbelow.

BRIEF DESCRIPTION OF THE DRAWINGS

FIGS. 3A–3F are explanatory views showing a representation of pixels in a portion of an image and a sliding processing window employed by the image enlarging system of FIG. 1;

FIG. 4 is an explanatory view showing a representation of interpolated pixels generated by the image enlarging system of FIG. 1 for the sliding processing window of FIGS. 3A–3F;

FIGS. 11A and 11B are diagrams of a table for a rule base of FIG. 10 for the adaptive filter of FIG. 1;

DETAILED DESCRIPTION

The present invention is disclosed with respect to an embodiment for use in an image enlarging system 20. The image which may, but need not be, a portion of a larger image, has a plurality of picture elements, e.g., pixels. The image is represented by image data 22 in the form of a plurality of pixel values, e.g., digital codes. Each pixel value represents an associated one of the plurality of pixels in the image.

The image enlarging system 20 comprises a plurality of subroutines, or modules, each of which includes a plurality of instructions to be executed by a processor. It will be apparent however, that the present invention could also be embodied in hardware and/or firmware or in any combination of hardware, software and/or firmware.

Figure 1:
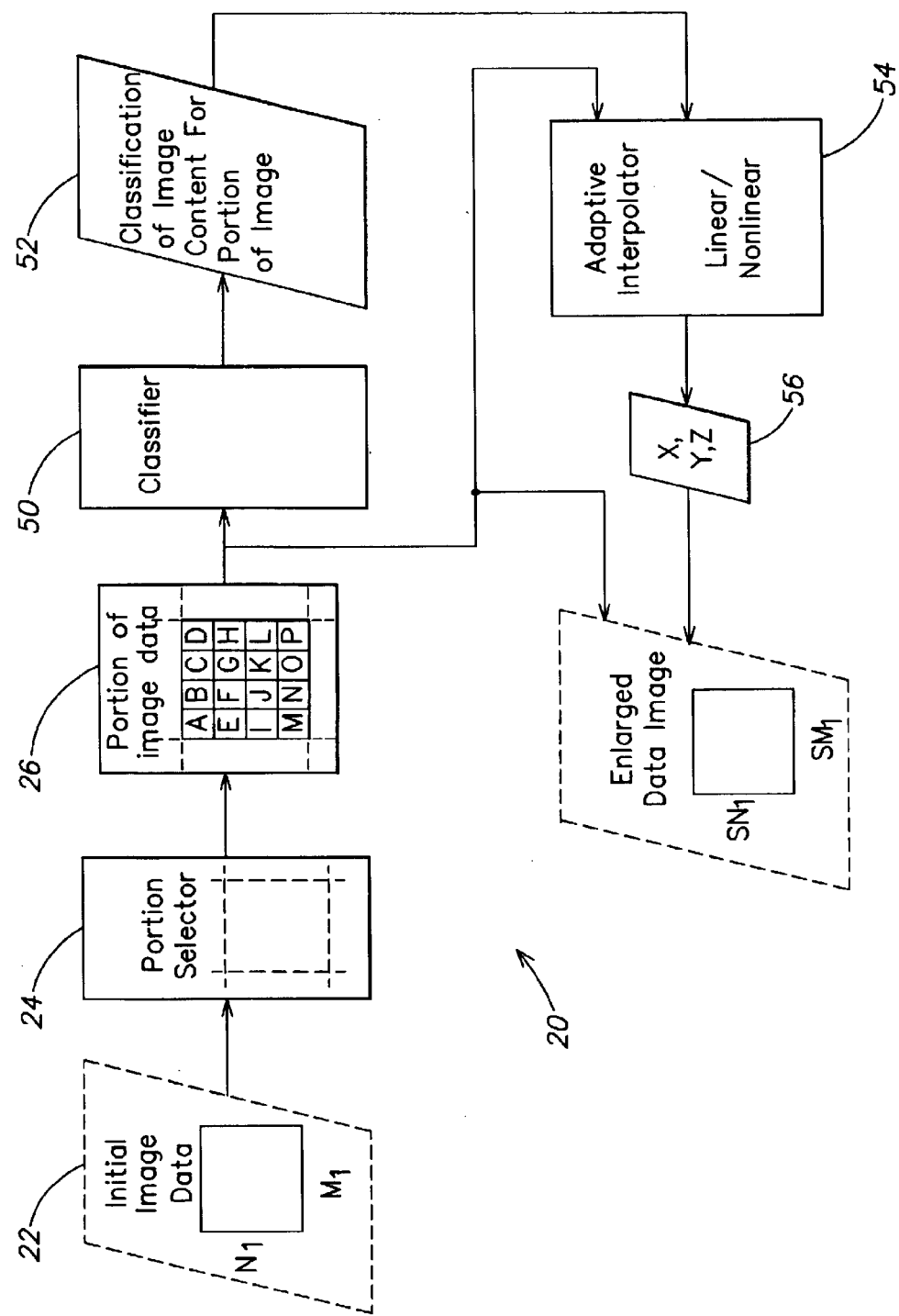
FIG. 1 is a data flow diagram showing an image enlarging system in accordance with one aspect of the present invention.

The image enlarging system 20 includes a portion selector module 24, which receives the image data 22 representative of the image to be enlarged. The portion selector module 24 defines a processing window 26, i.e., a portion of the image data representative of a portion of the image currently being processed by the image enlarging system. In this embodiment, the processing window 26 represents a 4×4 array of pixels, and is represented in FIG. 1 by reference letters A through P. Other shaped and/or smaller or larger processing windows could be used. The size and/or shape of the processing window may be predetermined or determined dynamically, and need not be constant.

Figure 2:
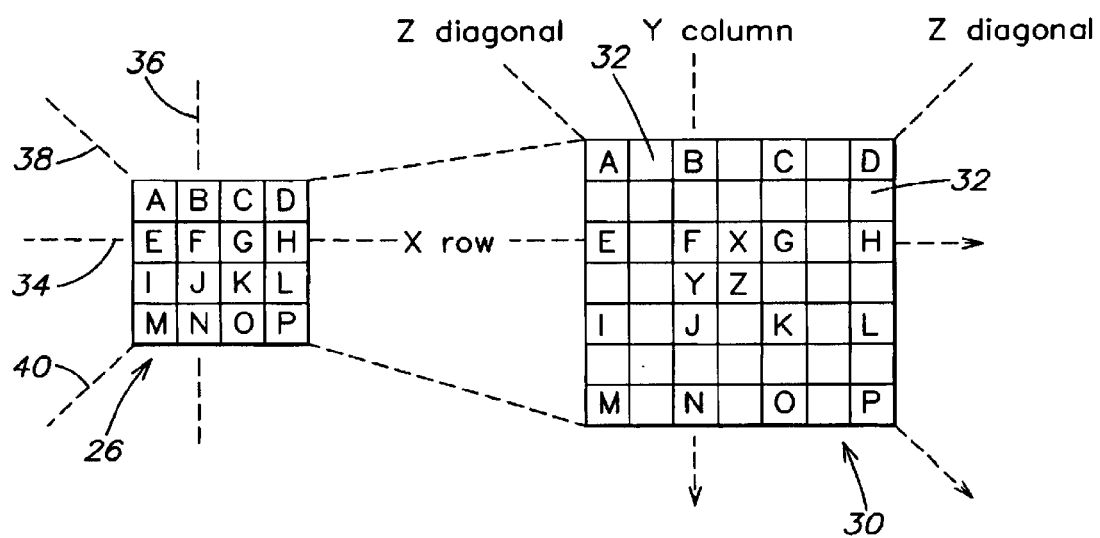
FIG. 2 is an explanatory view showing a representation of an array of pixels A-P in a portion tf an image and a representation of a portion of the enlarged image having corresponding pixels along with three interpolated pixels X, Y, Z generated by the image enlarging system of FIG. 1.

FIG. 2 shows the portion of the image that is within the processing window 26 and a portion of an enlarged image 30 formed therefrom. The portion of the enlarged image 30 includes pixels A through P corresponding to pixels A through P in the portion of the image within the processing window 26. The portion of the enlarged image 30 further includes three pixels X, Y, Z representing the pixels currently to be interpolated by the image enlarging system 20. The pixels X, Y, Z are just a few of the pixels that form the interposed rows and columns of the enlarged image 30 and are to be interpolated to generate the enlarged image 30. Other pixels to be interpolated are represented by empty squares 32 in the enlarged image. The X pixel is disposed in a row of pixels referred to herein as a X row. The Y pixel is disposed in a column of pixels referred to herein as a Y column. The Z pixel is disposed in diagonals of pixels referred to herein as Z diagonals.

FIG. 2 further illustrates a plurality of prescribed spacial directions, namely, a first prescribed spatial direction 34 (e.g., the horizontal direction), a second prescribed spacial direction 36 (e.g., the vertical direction), a third prescribed spacial direction 38 (e.g., a first diagonal direction), and a fourth prescribed spacial direction 40 (e.g., a second diagonal direction). The pixel X is offset in the horizontal direction 34 from the pixel F. The pixel Y is offset in the vertical direction 36 from the pixel F. The pixel Z is offset in the first diagonal direction 38 from the pixel F.

The processing window moves one column or one row of pixels at a time, as shown by FIGS. 3A–3F, to allow progressive interpolation of all of the pixels of the interposed columns and rows. The portions of the image data defined by the moving processing window overlap one another. FIGS. 3A–3F show the processing window scanning horizontally and then rastoring vertically, which is recommended when the image data is organized, i.e., stored by rows. If the image data is stored column-wise, then it may be desirable for the processing window to scan in the vertical direction and rastor in the horizontal direction.

Figure 4:
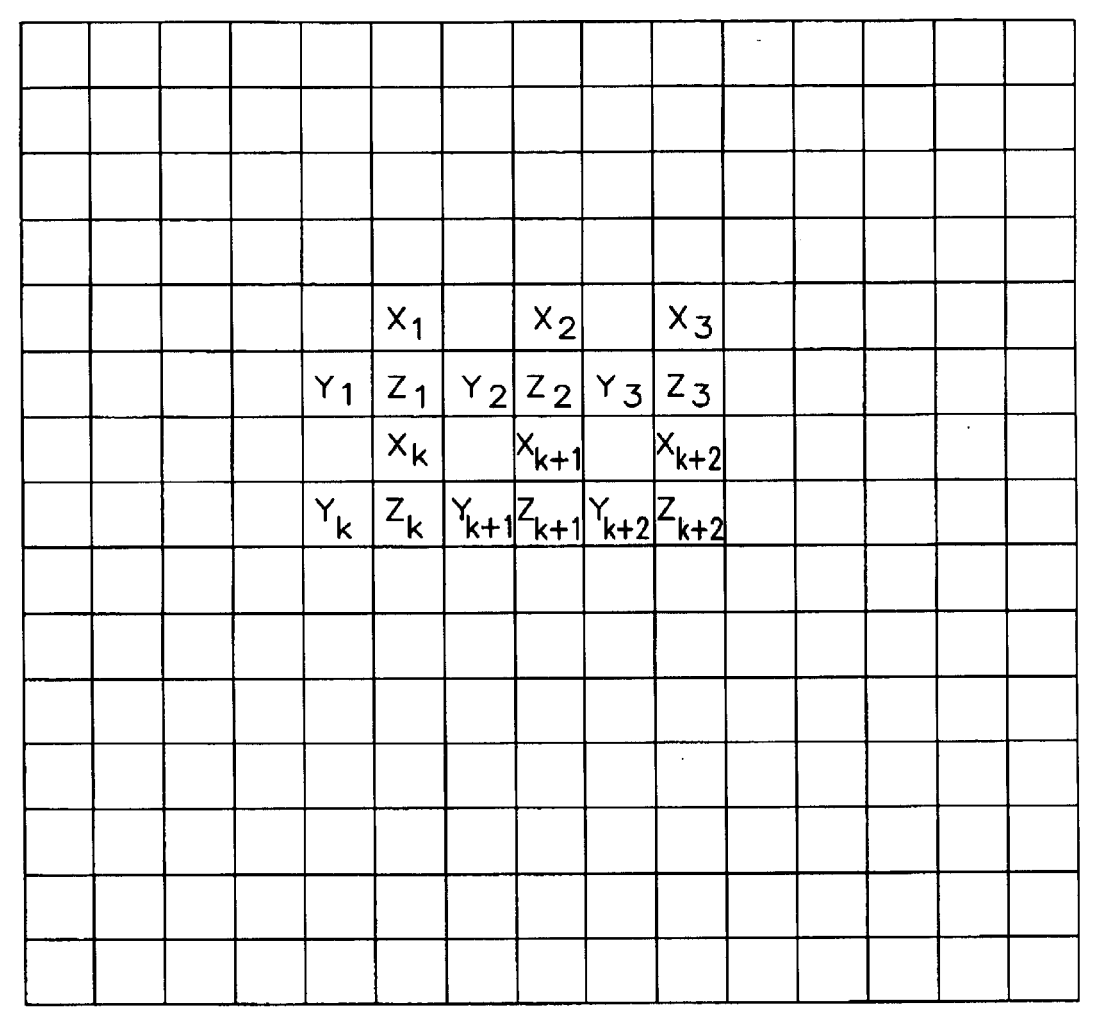

FIG. 4 shows a portion of the enlarged image including interpolated pixels generated for each of the processing windows of FIGS. 3A–3F. Specifically, pixels $X_1, Y_1, Z_1$ are generated in association with the processing window of FIG. 3A; pixels $X_2, Y_2, Z_2$ are generated in association with the processing window of FIG. 3B; pixels $X_3, Y_3, Z_3$ are generated in association with the processing window of FIG. 3C; pixels $X_k, Y_k, Z_k$ are generated in association with the processing window of FIG. 3D; pixels $X_{k+1}, Y_{k+1}, Z_{k+1}$ are generated in association with the processing window of FIG. 3E; pixels $X_{k+2}, Y_{k+2}, Z_{k+2}$ are generated in association with the processing window of FIG. 3F. For interpolating near the boundaries of an image, polynomial extrapolation, which is well known, can be used to generate data for extra rows and columns to extend the image on top, bottom, left and/or right.

Referring again to FIG. 1, the portion selector module 24 outputs the portion of the image data to a classifier module 50, which classifies the image content for the portion of the image represented by the portion of the image data in the processing window 26. As used herein, the term classify is defined as to determine an indication of the image content in accordance with at least one criterion. The at least one criterion may have any form including, but not limited to rules, processes, functions, formulas, equations, look up tables, mappings, etc., or any combination thereof. Classification criteria may be obtained from any source; for example, the classification criteria may be specified by designers of the system, by one of the users of the system or by anyone or anything else or any combination thereof. Classification criteria may be predetermined or may be determined dynamically. One set of classification criteria may be uniformly applied to each image portion to be classified, or a set of classification criteria used for one portion of the image may be different than that used for one or more of the other portions of the image and/or that used for other images. However, the classifier module 50 typically need not have any a priori knowledge as to the content of the image nor need it attempt to classify the content of the image as a whole.

The classifier module 50 has an output that provides data indicative of the classification 52, which is supplied to an adaptive interpolator module 54, which further receives the portion of the image data 26 provided by the portion selector module 24. The adaptive interpolator module 54 has an output that provides data 56 representing the current interpolated data, i.e., for pixels X, Y, Z. As described in further detail below, the adaptive interpolator module 54 uses adaptive methods in that it selects between linear interpolation and non-linear interpolation, dependent upon the classification of the image content of the portion of the image, in interpolating data to be used in generating the enlarged image.

The adaptive interpolator may use a selection strategy, which may have any form including, but not limited to rules, processes, functions, formulas, equations, look up tables, mappings, etc., or any combination thereof. A selection strategy may be obtained from any source; for example, the strategy may be specified by designers of the system, by one of the users of the system or by anyone or anything else or any combination thereof. A selection strategy may be predetermined or may be determined dynamically. One selection strategy may be uniformly applied to each image portion, or a selection strategy used for one portion of the image may be different than that used for one or more of the other portions of the image and/or that used for other images.

Linear interpolation typically makes use of addition and/or multiplication operations. For example, the linear interpolation used by the image enlarging system may comprise polynomial interpolation, in particular, third order (cubic), however, any other order including, but not limited to, first (linear) and second (quadratic) orders may also be used. Non-linear interpolation typically makes use of addition operations and/or multiplication operations and/or other operations, including, but not limited to, min, max, median, and/or mode operations. For example, the non-linear interpolation may comprise median interpolation or modal interpolation, although, any other non-linear interpolation may also be used.

Note that cubic interpolation may be viewed as a weighted average, with the most weight given to the pixels closest to the pixel being interpolated. In contrast to cubic interpolation, median interpolation need not be a weighted average and therefore may be less influenced, compared to cubic interpolation, by extreme pixel values close to the pixel being interpolated. Median interpolation can therefore can provide sharper results than cubic in cases when the pixel to be interpolated is near but not on an edge. The adaptive methods help keep the image sharp and retain the detail of the image by helping to avoid introduction of unwanted artifacts that blur and/or introduce rings around edges, i.e., boundaries, such as for example, between light and dark regions in the image.

Figure 12:
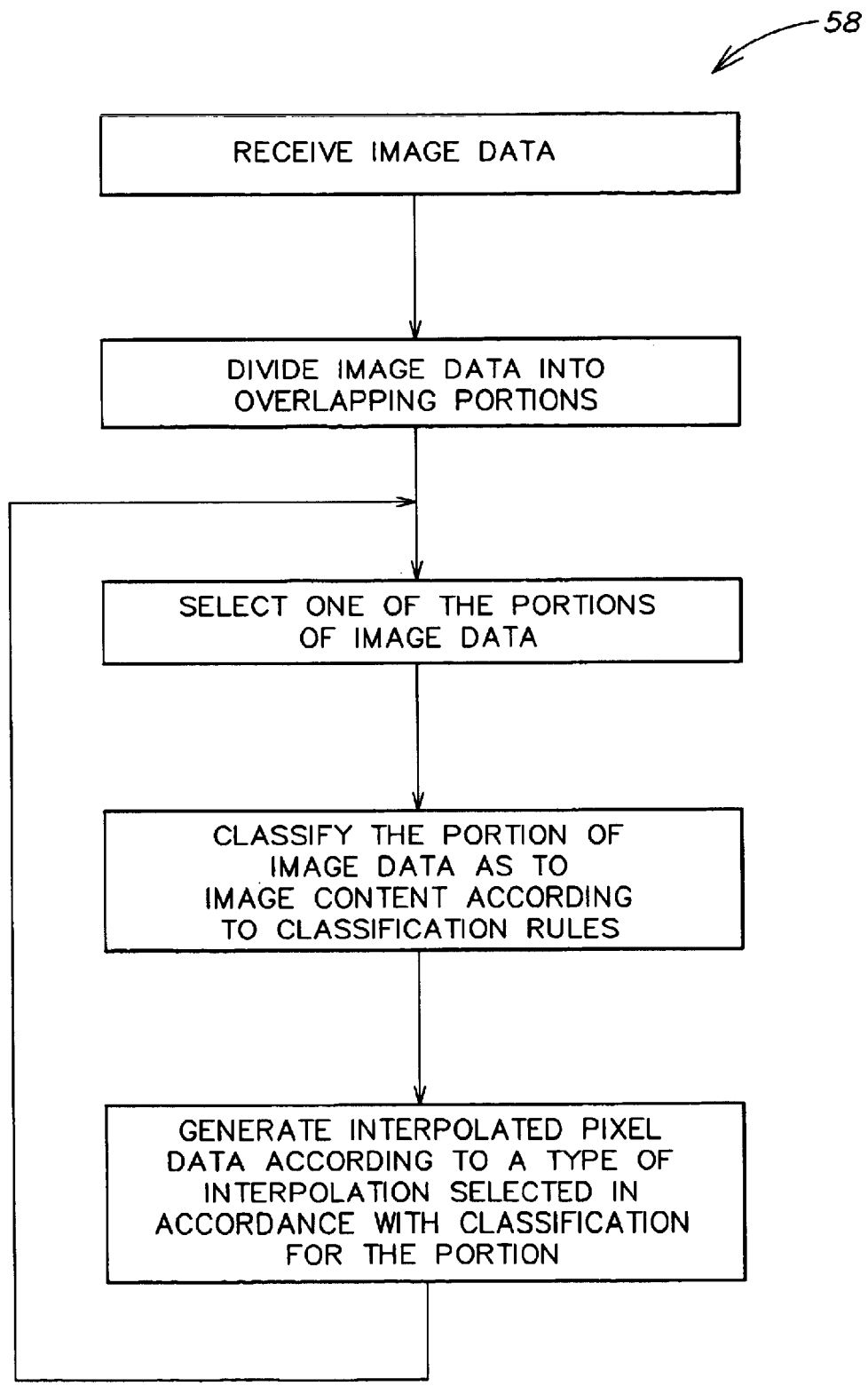
FIG. 12 flowchart showing the steps carried out by the image enlarging system of FIG. 1 in one embodiment.

FIG. 12 shows a flowchart 58 of the steps carried out by the image enlarging system of FIG. 1.

In this embodiment, the image enlarging system interpolates data to enlarge the image by a factor, s, equal to two. The factor of two is chosen so as to help minimize complexity of the system. Consequently, scaling by any power of two may be accomplished by repeating the enlargement process an appropriate number of times, e.g., enlarging twice enlarges by a factor of four, enlarging three times enlarges by a factor of eight. It is still possible, even in an embodiment that enlarges by a factor of two, to achieve overall scaling factors that are not powers of two for example by 1) using the image enlarging system to scale by a power of two and 2) scaling the result using a supplemental scaling method, as suggested by the following equation:

$$\text{overall scaling factor} = (c)(2^n) \qquad (1)$$

where c is scaling provided by a supplemental scaling method, typically less than or equal to 1 n is the number of times that the enlarging algorithm of the image enlarging system is applied.

For example, an overall scaling factor of three can be achieved based on equation (1) with c equal to 0.75 and n equal to 2. Scaling by a factor of three can alternatively be achieved with c equal to 1.5 and n equal to 1. Bicubic interpolation methods are well known and may be used to provide the supplemental scaling factor c. Of course, the present invention is not limited to embodiments for enlarging by a factor of two.

Figure 5:
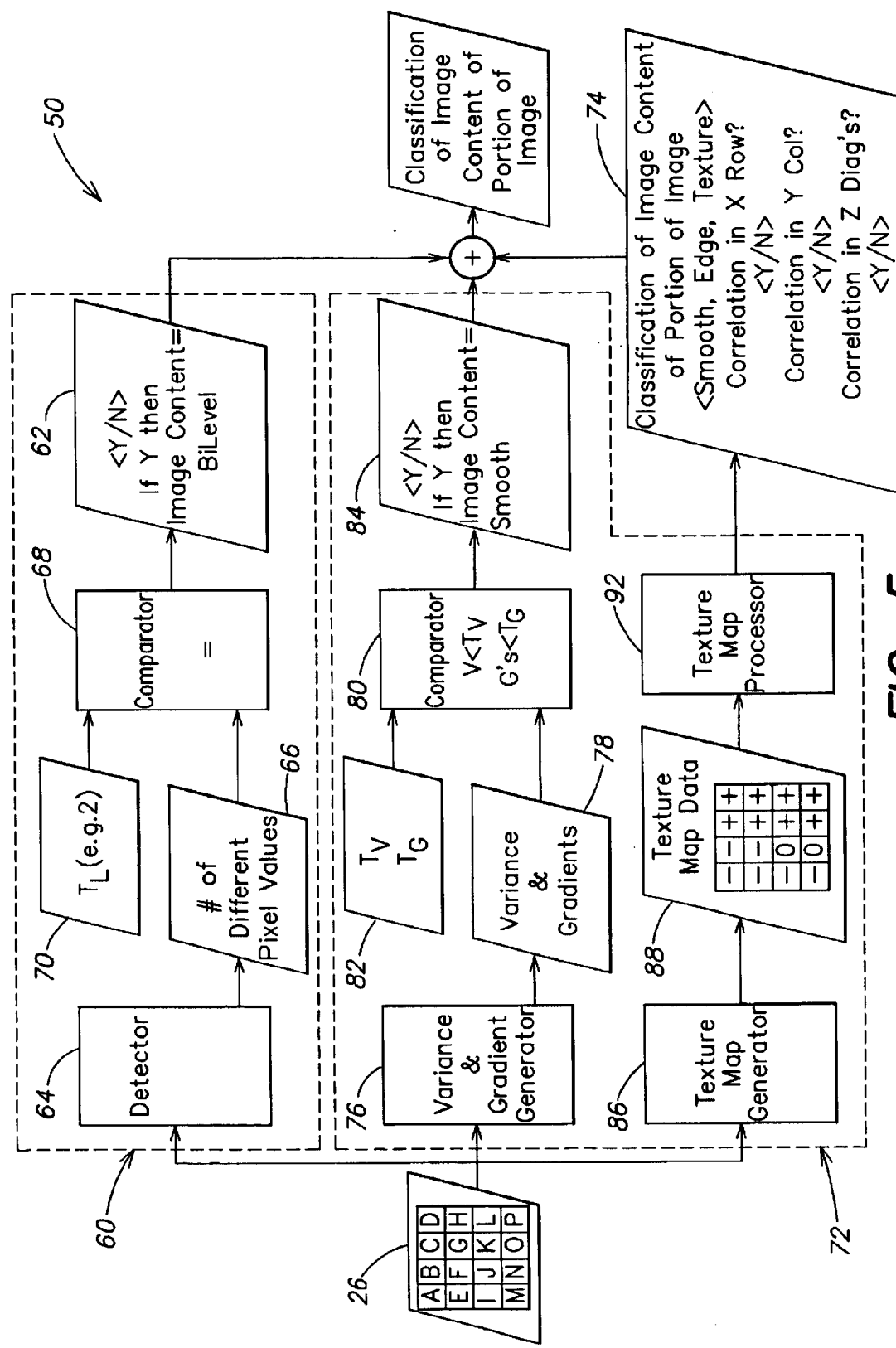
FIG. 5 is a data flow diagram of a classifier of the image enlarging system of FIG. 1.

FIG. 5 shows one embodiment of the classifier module 50, which has a first detector module 60 that provides an indication 62 as to whether the portion of the image data is bi-level. A portion of an image is bi-level when all of the pixel values associated with the portion in the image have one of two values. An image can have portions which are of themselves bi-level in nature, without the entire image being a bi-level image.

The first detector module 60 may include a module 64 with an input that receives the portion of the image data 26 from the portion selector module 24. An output of the module 64 provides an indication 66 of the number of different pixel values in the portion. The indication 66 is supplied to a first input of a comparator module 68. A second input of the comparator module 68 receives an indication 70 of a threshold value $T_L$. The comparator module 68 has an output that provides the indication 62 of whether the image content of the portion of the image is bi-level, e.g., by determining whether the number of different pixel values is equal to a threshold value $T_L$ equal to two. In other embodiments, the first module 60 may be used to compare the number of different pixel values in the portion of the image to other threshold values, e.g., three, four, eight.

Depending on the expected images and the size of the processing window, it may be desirable in some embodiments to select a threshold value other than two. For example, in some embodiment, rather than detecting a bi-level image, the first module 60 may detect whether the number of different values is no greater than a threshold value that is no greater than twenty percent of a total number of the pixel values.

In the case where the image content is not bi-level, the portion of the image data is supplied to a second detector module 72, which provides an indication 74 as to whether the image content of the portion is smooth, texture, or edge, and whether the image content of the portion of the image has at least a specified measure of correlation in predetermined directions, namely along X row, along Y column, and along Z diagonals. The reasons for providing these indications is explained in further detail below. Classifications such as smooth texture and edge are well-known. Smooth commonly refers to a region having a high degree of correlation. Texture typically refers to a region having variations. An edge is commonly considered a boundary between two or more distinguishable regions. For example, in an image of a person's head, the forehead may be considered smooth, the hair may be considered texture, and the boundary between the forehead and the hair may be considered an edge.

The second detector module 72 has a variance and gradient generator module 76 that receives the portion of the image data 26 and computes a variance, v, of the pixel values of the portion, according to the following equation:

$$v = \Sigma(\text{pixel value} - \text{average value})^2 \quad (2)$$

where average value is the average value for the pixel values in the portion of the image data In addition, the variance and gradient generator module computes, for each pixel in the portion of the image, an approximate horizontal gradient and an approximate vertical gradient. The approximate horizontal gradient for a pixel is computed as the difference between the pixel value for that pixel and the pixel value for a neighbor pixel, e.g., the right neighbor (if it exists). The approximate vertical gradient for a pixel is computed as the difference between the pixel value for the pixel and the pixel value for its neighbor below (if it exists). An indication 78 of the variance for the portion and the approximate gradients for all of the pixels in the portion are provided to a comparator module 80, which further receives an indication 82 of a threshold $T_V$, and a threshold $T_G$. The comparator module 80 has an output that provides an indication 84 of whether the variance is below the threshold $T_V$, and whether all the absolute values of the approximated gradients for all of the pixels are below a threshold $T_G$. If the variance and the gradients are below the thresholds, the image content for the portion is considered smooth. Suitable values for the threshold $T_V$ and $T_G$ may be determined empirically to provide the desired results for the types of images expected, although the present invention is not limited to such. For example, if the pixel values are 8 bits, i.e., 256 grayness levels, $T_V$ may be 60, and $T_G$ may be 40. Of course $T_V$ and $T_G$ are not limited to such values.

Figure 6:
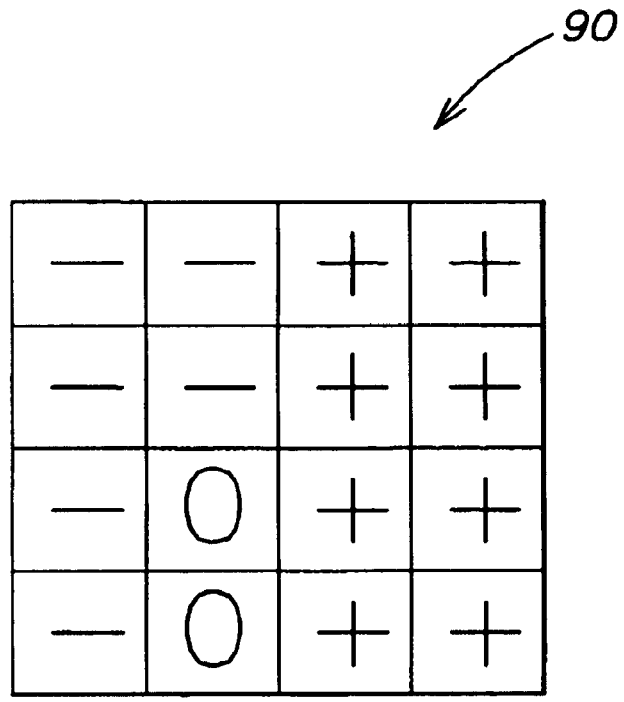
FIG. 6 is an explanatory view showing a representation of an example of a texture map generated by a texture map generator of the classifier of FIG. 3.

If the output from the comparator module 80 does not indicate that the portion of the image is smooth, then the portion of the image data is supplied to a texture map generator module 86. The texture map generator module 86 generates texture map data 88 for the portion of the image 26. The texture map data 88 is indicative of the image content of the portion of the image 26. FIG. 6 shows a representation of an example of a texture map 90 for a portion of an image. Referring again to FIG. 5, the texture map data 88 is supplied to a texture map processor module 92, which has an output that provides the indication 74 of whether image content of the portion of the image is smooth, edge, or texture, and the indication of whether the image content has at least a specified measure of correlation along the predetermined directions.

Figure 7:
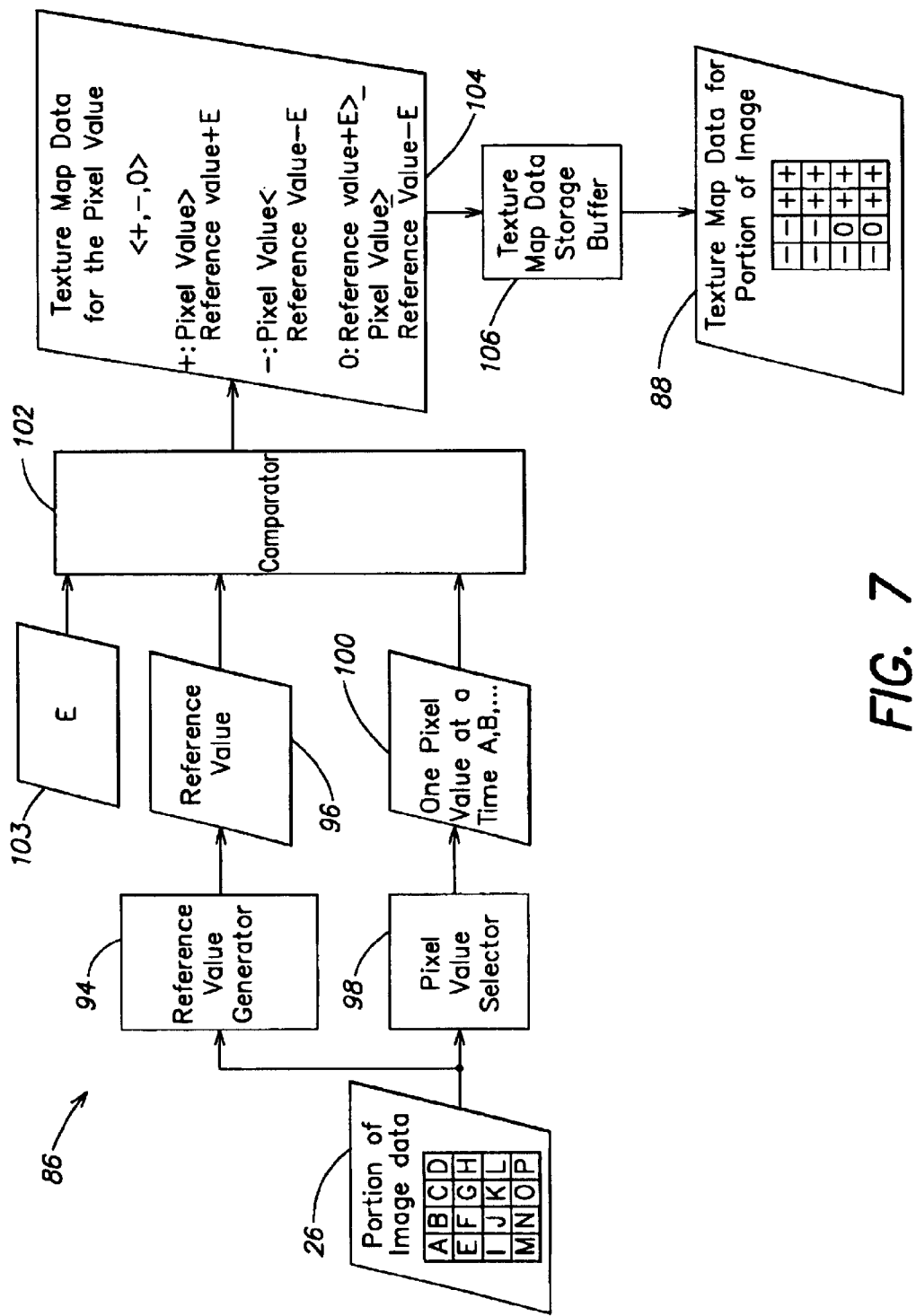
FIG. 7 is a flow diagram of a texture map generator of the classifier of FIG. 5.

Referring now to FIG. 7, one embodiment of the texture map generator module 86 includes a reference value generator module 94 having an input that receives the portion of the image data 26 and an output that provides an indication 96 of a reference value, e.g., the mean (average value), computed from the pixel values for the portion of the image. The portion of the image data 26 is further supplied to a pixel value selector module 98 for defining a single pixel sliding processing window 100 representative of the pixel currently being processed by the texture map generator, beginning for example with the pixel value for pixel A.

The pixel value within the processing window 100 and the indication 96 of the reference value are supplied to a comparator module 102, which further receives an indication 103 of a value e. An output of the comparator module 102 provides an indication 104 of whether the pixel value is within a range that includes the reference value (e.g., reference value+e>=pixel value>=reference value −e), greater than the range (e.g., reference value +e<pixel value) or less than the range (e.g., reference value −e >pixel value. Suitable values for e may be determined empirically to provide the desired results for the types of images expected. In this embodiment, the value of e is zero, but the value of e is not limited to such. The indication 104 provided by the output of the comparator module 102 may be, for example, a zero (0) if the pixel value is within the range, a plus sign (+) if the indication is greater than the range, and a minus sign (−) if the pixel value is less than the range. Any other convention may also be used. The sliding processing window 100 moves one pixel at a time to allow texture map data to be generated for all of the pixels of the portion 26. The indication from the output of the comparator module 102 is supplied to a storage buffer 106 which stores and outputs the texture map data 88 for the portion of the image.

Figure 8A:
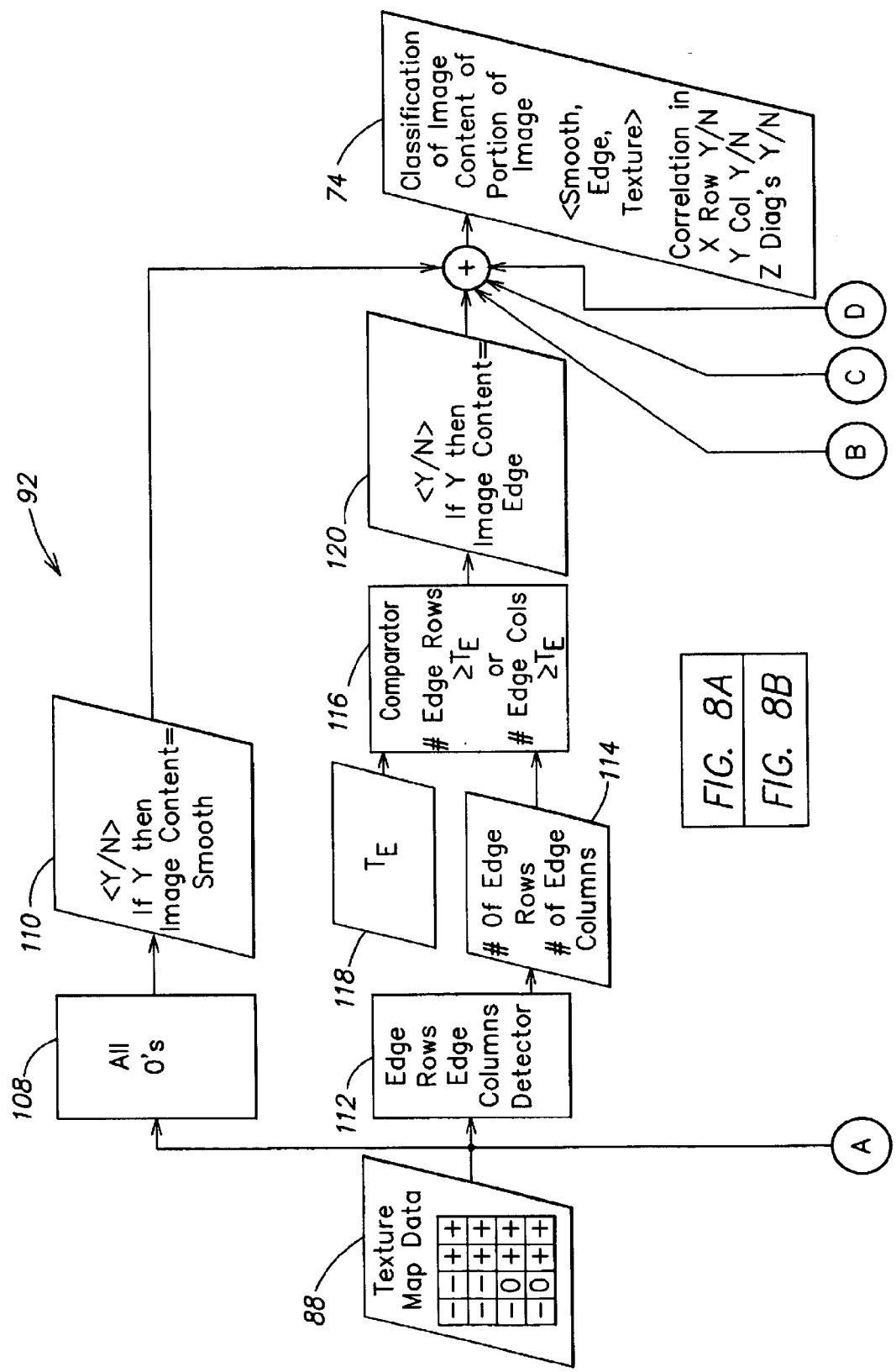
FIG. 8A and 8B are flow diagram of a texture map processor of the classifier of FIG. 5.
Figure 8B:
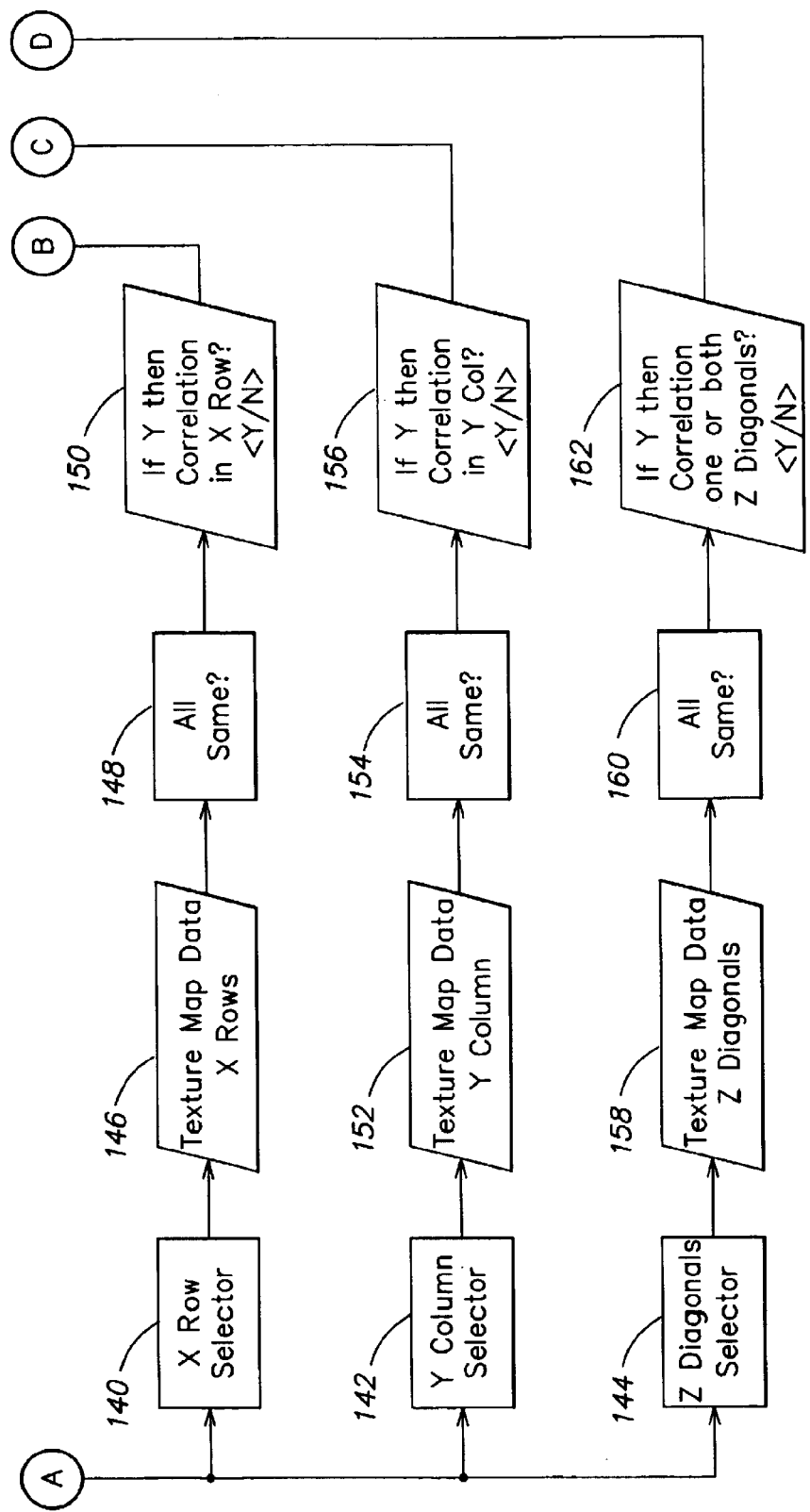
Figure 9A:
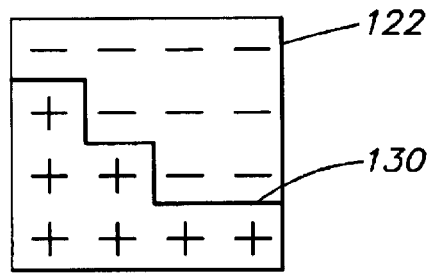
FIGS. 9A–9D are explanatory views each showing a representation of an example of a texture map for a portion of an image having an edge that extends from a side of the portion to an opposite side of the portion.
Figure 9B:
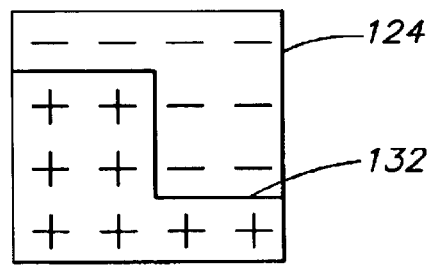
Figure 9C:
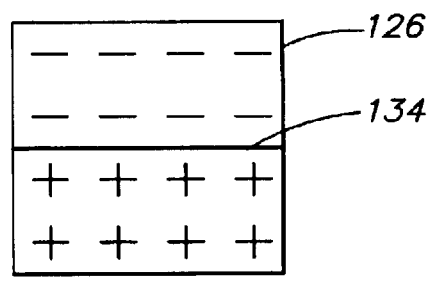
Figure 9D:
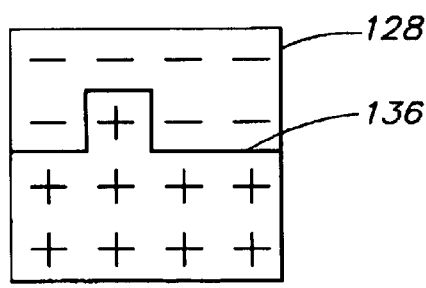

FIGS. 8A and 8B shows one embodiment of the texture map processor module 92, referred to herein as a procedure based embodiment. The texture map processor module 92 includes a detector module 108 that provides an indication 110 of whether the texture map data consists entirely of zeros (0's). If the texture map data consists entirely of zeros (0's) then the image content of the portion of the image is considered smooth. Otherwise, the texture map data 88 is supplied to a detector module 112 to determine a number of edge columns and edge rows. An edge column is defined herein as a column of the texture map having exactly one transition from plus sign (+) to minus sign (−) or from minus sign (−) to plus sign (+), and where there is at most one zero in the middle of such transition. An indication 114 of the number of edge rows and edge columns is supplied to a first input of a comparator module 116. The comparator module 116 has a second input that receives an indication 118 of a threshold value $T_E$, and an output that provides an indication 120 of whether the number of edge columns or the number of edge rows exceeds the threshold value $T_E$. If so, the image content of the portion of the image is classified as having an edge. FIGS. 9A–9D show representations of examples of texture maps 122–128 indicating portions of images having an edge 130–136, more specifically, an edge that extends from a side of the portion of the image to an opposite side of the portion of the image. If a portion of the image is classified neither as smooth nor as having an edge, then it is classified as a texture portion.

Referring again to FIGS. 8A and 8B, in a case where the portion is classified as having an edge or as texture, the texture map data 88 is provided to an X row selector module 140, a Y column selector module 142, and a Z diagonals selector module 144. The X row selector module 140 outputs the texture map data for the X row 146, which is in turn supplied to a comparator module 148 that provides an indication 150 of whether the data for the row is all the same, i.e., all plus signs (+), all minus signs (−), or all zeros (0's). If the data for the row is all the same, there is at least the specified measure of correlation along the X row. The Y column selector module 142 outputs the texture map data for the Y column 152, which is in turn supplied to a comparator module 154 that provides an indication 156 of whether the data for the column is all the same, i.e., all plus signs (+), all minus signs (−), or all zeros (0's). ). If the data for the column is all the same, there is at least the specified measure of correlation along the Y column. The Z diagonals selector module 144 outputs the texture map data for the Z diagonal 158, which is in turn supplied to a comparator module 160 that provides an indication 162 of whether the data for either of the diagonals is all the same, i.e., all plus signs (+), all minus signs (−), or all zeros (0's). ). If the data for either of the diagonals is all the same, there is at least the specified measure of correlation along such diagonal.

In some embodiments, the indications 148, 154, 160 from the comparator modules 150, 156, 162 may be used as an indication of a strong horizontal edge, a strong vertical edge, and/or a strong diagonal edge, respectively.

Figure 10:
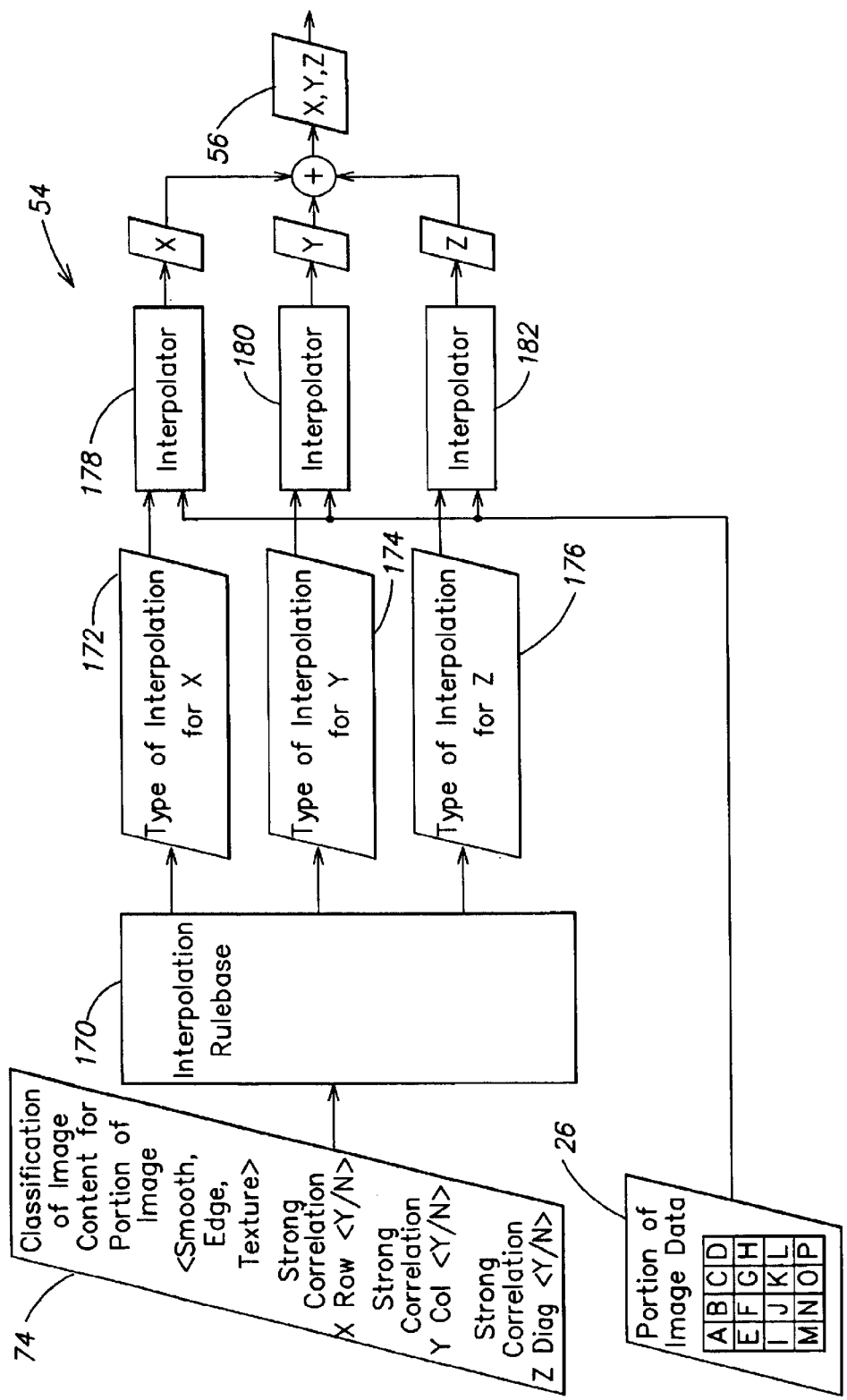
FIG. 10 is a data flow diagram of an adaptive interpolator of the image enlarging system of FIG. 1.

FIG. 10 shows one embodiment of the adaptive interpolator module 54, which includes an interpolation rulebase module 170 that receives the indication 74 of the classification of the image content of the portion of the image. The interpolation rulebase module 170 has three outputs. A first one of the outputs provides an indication 172 of a type of interpolation selected for X based on the classification of the image content of the portion. The second one of the outputs provides an indication 174 of a type of interpolation selected for Y. The third one of the outputs provides an indication 176 of a type of interpolation selected for Z.

The indication 172 of the type of interpolation selected for X is supplied to an interpolator module 178 which generates the interpolated pixel data, X, in accordance therewith. The indication 174 of the type of interpolation selected for Y is supplied to an interpolator module 180 which generates the interpolated pixel data, Y. The indication 176 of the type of interpolation selected for Z is supplied to an interpolator module 182 which generates interpolated pixel data Z.

Figure 11A:
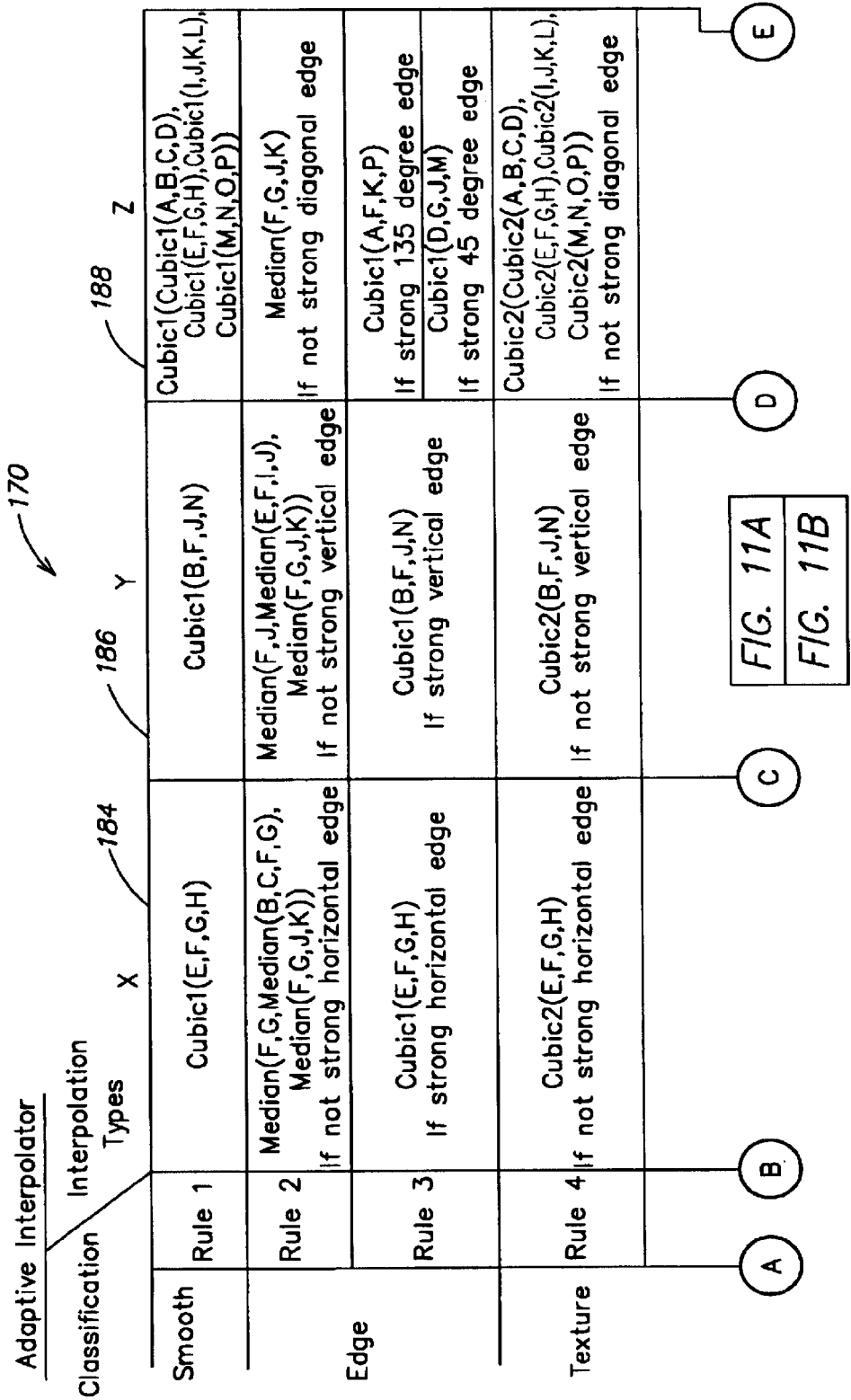

FIGS. 11A and 11B show one embodiment of the interpolation rule base module 170. The rule base has an X portion 184, a Y portion 186, and a Z portion 188. Each portion of the rule base has seven rules. Rule 1 of each rule base portion, for cases where the image content is smooth, specifies cubic interpolation (a type of linear interpolation) along a predetermined line containing the interpolated pixel. Rule 4 of the X, Y, and Z portions of the rule base specify cubic interpolation in cases where the image content is neither smooth nor has an identified edge. Rules 1, 4 are examples of a preference to linearly interpolate in cases where the image content does not include an identified edge, even if the image content is not smooth (Rule 4). Rules 3, 5 of the X, Y, and Z portions of the rule base specify that even in cases where the image content is not smooth and may have an edge, cubic interpolation is used to interpolate X, Y, and/or Z pixel data in cases where the image content has at least the specified measure of correlation along the X row, Y column, and/or a Z diagonal, respectively. Rules 3, 5 are examples of a preference to linearly interpolate along a path of isobrightness, i.e., similar brightness, even if the image content of the portion includes an edge and/or texture. The path of isobrightness may, but need not be, spatially coincident with an edge. Rule 2 of the X portion of the rulebase specifies median interpolation (a type of non-linear interpolation) to interpolate pixel data for X in cases where the image content has an edge but does not have at least the specified measure of correlation along the X row. Similarly, Rule 2 of the Y portion of the rule base specifies median interpolation to interpolate pixel data for Y in cases the image content does not have at least the specified measure of correlation along the Y column. Rule 2 of the Z portion of the rule base specifies median interpolation to interpolate pixel data for Z in cases the image content does not have at least the specified measure of correlation along one of the Z diagonals. Median interpolation is well known. Rule 2 is an example of a preference for non-linear interpolation in cases where the image content includes an edge and there is no identified path of isobrightness. It should be recognized that the Cubic 2 type of interpolation provides somewhat sharper results than the Cubic 1 type of interpolation. Rule 2 helps to preserve edges and prevent artifacts that could blur and/or introduce rings around the edges.

Example equations for performing the interpolation specified by Rule 1 are:

$$X=(-E+9F+9G-H)/16$$

$$Y=(-B+9F+9J-N)/16$$

$$Z_1=(-A+9B+9C-D)/16$$

$$Z_2=(-E+9F+9G-H)/16$$

$$Z_3=(-I+9J+9K-L)/16$$

$$Z_4=(-M+9N+9O-P)/16$$

$$Z=(-Z_1+9Z_2+9Z_3-Z_4)/16$$

Example equations for performing the interpolation specified by Rule 2 are:

$$X_1=(F+G+J+K-\max(F,G,J,K)-\min(F,G,J,K))/2$$

$$X_2=(B+C+F+G-\max(B,C,F,G)-\min(B,C,F,G))/2$$

$$X=(F+G+X_1+X_2-\max(F,G,X_1,X_2)-\min(F,G,X_1,X_2))/2$$

$$Y=(F+G+J+K-\max(F,G,J,K)-\min(F,G,J,K))/2$$

$$Y_1=(E+F+I+J-\max(E,F,I,J)-\min(E,F,I,J))/2$$

$$Y=(F+J+Y_1+Y_2-\max(F,J,Y_1,Y_2)-\min(F,J,Y_1,Y_2))/2$$

$$Z=(F+G+J+K-\max(F,G,J,K)-\min(F,G,J,K))/2$$

Example equations for performing the interpolation specified by Rule 3 are:

$$X=(-E+9F+9G-H)/16 \text{ IF CORRELATION ALONG X ROW}$$

$$Y=(-B+9F+9J-N)/16 \text{ IF CORRELATION ALONG Y COLUMN}$$

$$Z=(-A+9F+9K-P)/16 \text{ IF CORRELATION ALONG 135 DEGREE DIAGONAL}$$

$$Z=(-D+9G+9J-M)/16 \text{ IF CORRELATION ALONG 45 DEGREE DIAGONAL}$$

Example equations for performing the interpolation specified by Rule 4 are:

$$X=(-2E+10F+10G-2H)/16$$

$$Y=(-2B+10F+10J-2N)/16$$

$$Z_1=(-2A+10B+10C-2D)/16$$

$$Z_2=(-2E+10F+10G-2H)/16$$

$$Z_3=(-2I+10J+10K-2L)/16$$

$$Z_4=(-2M+10N+10O-2P)/16$$

$$Z=(-2Z_1+10Z_2+10Z_3-2Z_4)/16$$

Example equations for performing the interpolation specified by Rule 5 are:

$$X=(-E+9F+9G-H)/16 \text{ IF CORRELATION ALONG X ROW}$$

$$Y=(-B+9F+9J-N)/16 \text{ IF CORRELATION ALONG Y COLUMN}$$

$$Z=(-A+9F+9K-P)/16 \text{ IF CORRELATION ALONG 135 DEGREE DIAGONAL}$$

$$Z=(-D+9G+9J-M)/16 \text{ IF CORRELATION ALONG 45 DEGREE DIAGONAL}$$

Rules 6, 7 of the X, the Y, and the Z portions of the rule base specify non linear interpolation, e.g., modal interpolation, to interpolate pixel data in cases where the image content is bi-level. As stated above, a bi-level image has exactly two pixel values, i.e., exactly two levels of greyness. As with Rules 2, Rules 6, 7 help to preserve edges and prevent artifacts that could blur and/or introduce rings around the edges. The term mode refers to most frequently occurring. Mode(A,B,C,D) is defined as the most frequently occurring pixel value among the pixel values for A, B, C, D. If both levels of greyness are equally frequently occurring among A, B, C, D, then Mode(A,B,C,D) is determined as the level of greyness that corresponds to the level of greyness of the foreground of the portion of the image, i.e., the processing window, as distinguished from the level of greyness that corresponds to the level of greyness of the background of the portion of the image. The foreground is determined as the greyness level occurring less frequently among the pixel values for the portion of the image. If a foreground greyness level can not be determined, i.e., both levels of greyness are equally occurring for the portion of the image, Mode(A,B,C,D) is determined as the greyness level which represents the darker color, e.g., black, because the foreground of a bi-level image is usually darker than the background.

Figure 13A:
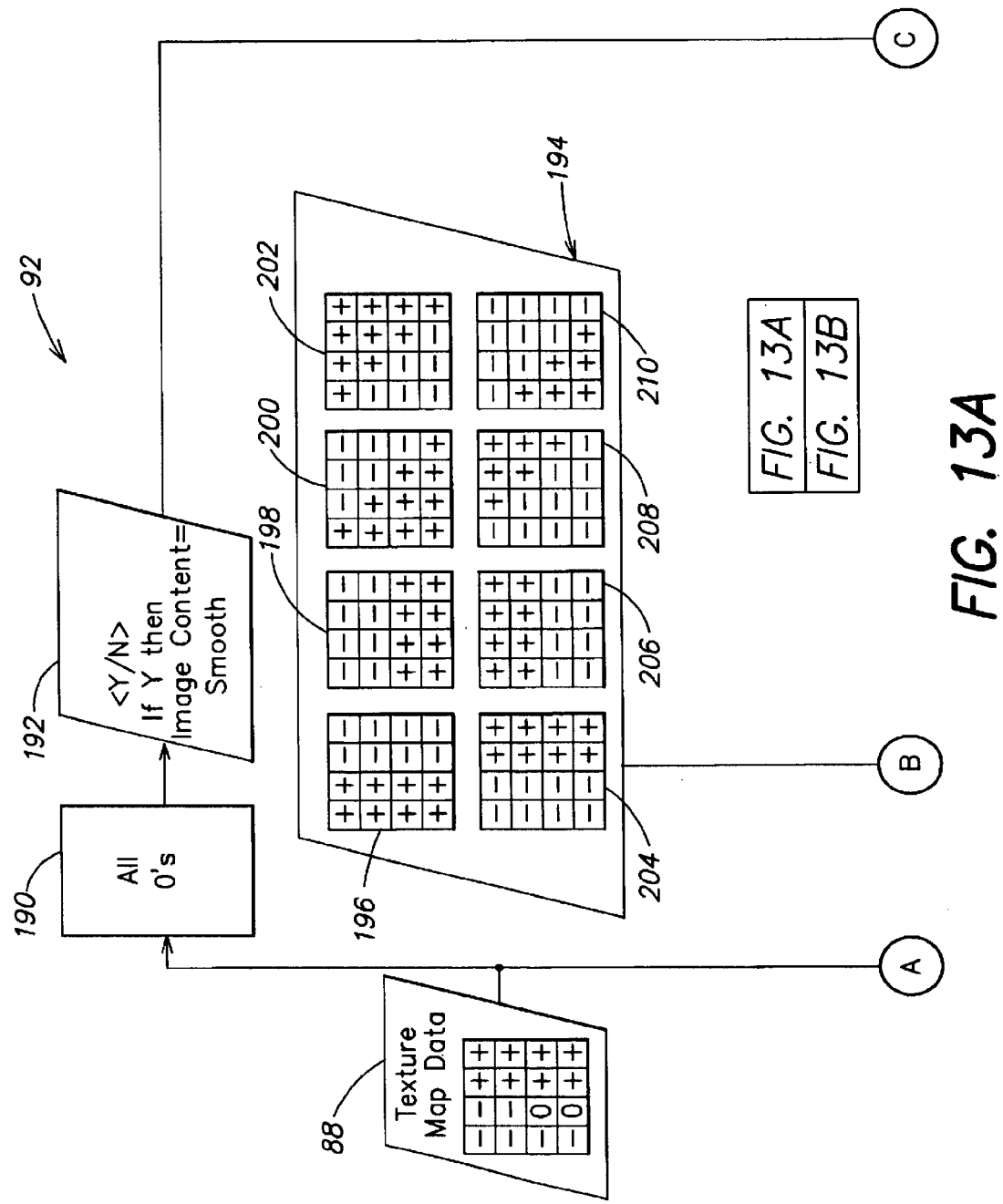
FIGS. 13A and 13B are data flow diagrams of an alternative embodiment of a portion in FIGS. 8A and 8B of the texture map processor of FIG. 3.
Figure 13B:
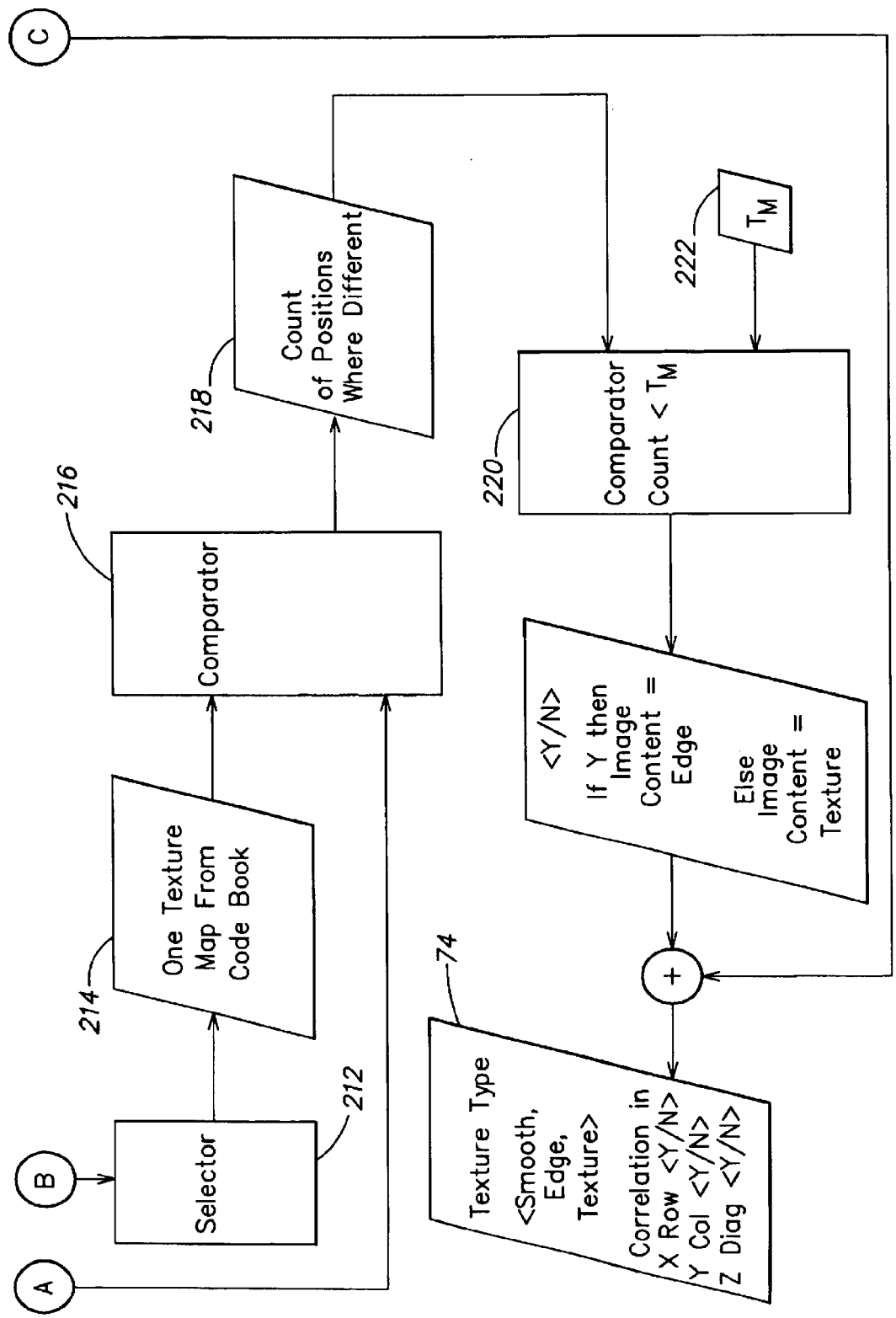

FIGS. 13A and 13B show an alternative embodiment of the texture map processor module 92 (FIG. 5), referred to herein as a code book based embodiment, which includes a detector module 190 with an output that provides an indication 192 of whether the texture map data consists entirely of zeros (0's), and if so, the image content of the portion of the image is classified as smooth. The texture map processor module further includes a texture map data base 194. Each of the texture maps 196–210 in the database 194 are representative of a portion of an image having an edge.

The texture maps from the database 194 are supplied to a selector module 212. The selector module 212 selects one of the texture maps from the data base 194 and provides the selected texture map 214 to a first input of a comparator module 216. A second input of the comparator module 216 receives the texture map 88 for the portion of the image 26. The comparator module 216 has an output that provides an indication 218 of a count of positions where the texture map data 88 for the portion of the image 26 differs from the selected texture map 214 from the data base. The selector module 212 sequences one at a time through all of the texture maps in the texture map data base 194 to allow the texture map data 88 for the portion of the image 26 to be compared (by a comparator module 220) to each of the texture maps in the texture map data base 194. If, for any of the texture maps in the texture map data base 194, the count 218 is less than a threshold value $T_M$ 222, then the image content of the portion of the image is classified as having an edge. In this example the threshold value, $T_M$, has a value of two, however the threshold value is not limited to such. Suitable values for the threshold may be determined empirically to provide the desired results for the types of images expected, although the present invention is not limited to such. In this embodiment, it may be particularly desirable to implement the texture map processor with special purpose hardware for use in pattern matching.

In this embodiment, the above described method and apparatus helps to keep the image sharp thereby helping to retain the detail of the image, however, this is not intended as a limitation on the present invention. The invention may also help to avoid introduction of unwanted artifacts. While the invention does not require specialized hardware, an embodiment with specialized hardware could speed execution. Furthermore, because the adaptive method of the present invention has the ability to select non-linear interpolation for a portion of the image, the types of linear interpolation employed by the adaptive need not be as complex (and therefore may be faster and easier to execute than otherwise be required), although this depends on the embodiment and is not intended as a limitation of the present invention in any way, shape or form.

Although the present invention has been described with respect to embodiments having equations for performing the interpolation, any other suitable method for performing the interpolation may be used including but not limited to using a look-up table. When a look up table is used, some round off errors will typically occur due to the presence of discrete values in the look up table. In addition, the types of interpolation are not limited to the equations in FIGS. 11A and 11B. Furthermore, the interpolated pixel may be anywhere within the portion of the image. Nor is the present invention limited to the rules disclosed above for selecting a type of interpolation. Any device and/or method for selecting a type of interpolation may be used. Linguistic variables need not be used.

The present invention is not limited to the classifier or the classification criteria that are disclosed above. There is no limit to the types of classifiers and classification criteria that may be used. For example, various methods for classifying image content are known. Any kind of classification criteria may be provided. Thus, other devices and/or methods may be used to detect the presence of the image content described above. Other methods for classifying an image include but are not limited to segmentation, i.e., connected component analysis. For example, any method may be used to determining whether the image content of the first portion of the image includes an edge and/or determine whether an edge extends from a side of the first portion of the image to an opposite side of the first portion of the image. Furthermore, any method may be used to determine whether there is a specified measure of correlation along a line or along a spatial direction. The line and/or spatial direction need not be predetermined. In addition, the classifier may be used to detect the presence of other types of image content.

Furthermore, the indication of the classification may have any form. The classifier need not employ linguistic variables. The classification may but need not be based on image content criteria perceptible to the human eye.

Although the method and apparatus of the present invention is disclosed with respect to an embodiment that processes portions of the image sequentially, in another embodiment, the method and apparatus of the present invention may process more than one portion of the image in parallel.

The method and apparatus is not limited to use in image enlarging systems. For example, in another embodiment, the method and apparatus may be used for upsampling in a image compression system having hierarchical coding, such as for example, as is disclosed in patent application titled, "Method and Apparatus Use in An Image Compression/Decompression System That Uses Hierarchical Coding" by Dube et. al., filed on same date herewith, and incorporated by reference herein. Compression systems based on hierarchical coding typically use downsampling to generate a first hierarchy of data sets, wherein each data set of the first hierarchy has a lower resolution than that of the preceding data sets in the first hierarchy, and use upsampling beginning with one of the data sets in the first hierarchy to generate a second hierarchy of data sets, wherein each data set in the second hierarchy has a higher resolution than that of the preceding data sets in the second hierarchy.

The system, which may include but is not limited to the selector, the classifier, and the adaptive interpolator, may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object oriented programming languages, and combinations thereof.

Each module or step described above and/or shown in the accompanying figures may correspond to separate modules of a computer program, or may be separate computer programs. Such modules may be operable on separate computers or other devices.

A computer system with which the various elements of the image enlarging system of FIG. 1 may be implemented either individually or in combination typically includes at least one main unit connected to both an output device which displays information to a user and an input device which receives input from a user. The main unit may include a processor connected to a memory system via an interconnection mechanism. The input device and output device are also connected to the processor and memory system via the interconnection mechanism.

The invention is not limited to a particular computer platform, particular processor, or a particular programming language. Additionally, the computer system may be a multiprocessor computer system or may include multiple computers connected over a computer network.

One or more output devices may be connected to the image enlarging system. Example output devices include cathode ray tubes (CRT) display, liquid crystal displays (LCD) and other video output devices, printers, communication devices such as a modem, storage devices such as a disk or tape, and audio output. One or more input devices may be connected to the computer system. Example input devices include a keyboard, a keypad, trackball, mouse, pen and tablet, communication device, and data input devices such as audio and video capture devices. The invention is not limited to the particular input or output devices used in combination with the computer system or to those described herein. The computer system may be a general purpose computer system which is programmable using a computer programming language such as C, C++, Java, or other language, such as a scripting language or even assembly language. The computer system may also be specially programmed, special purpose hardware, or an application-specific integrated circuit (ASIC).

In a general purpose computer system, the microprocessor may or may not execute a program called an operating system, which controls the execution of other computer programs and provides scheduling, debugging, input/output control, accounting, compilation, storage assignment, data management, communication control, and/or related services. The processor and operating system define computer platforms for which application programs and high level programming languages are written. A memory system typically includes a computer-readable and writable non-volatile recording medium, of which a magnetic disk, a flash memory, and tape are examples. The disk may be removable, known as a floppy disk, or permanent, known as a hard drive. Typically, in operation, the processor causes data to be read from the non-volatile recording medium into an integrated circuit memory element, which is typically a volatile, random access memory, such as a dynamic random access memory (DRAM) or static memory (SRAM). The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Having thus described the invention with respect to several embodiments, various alterations, modifications, and improvements will occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of processing an image comprising the steps of;

receiving image data representative of pixels in an image;

classifying the image content of a first portion of the image based on a first portion of the image data representative of pixels in the first portion of the image;

selecting a type of interpolation from a group including linear interpolation and non-linear interpolation in response to the step of classifying the image content of the first portion of the image; and using the selected type of interpolation to generate interpolated pixel data representative of an interpolated pixel adjacent at least one of the pixels in the first portion of the image;

wherein the step of classifying the image content of a first portion of the image includes the step of defining a processing window representative of an array of the pixels in the image, the array having N rows and M columns, wherein N and M each have a magnitude of at least four, wherein the step of using the selected type of interpolation to generate interpolated pixel data includes generating at least one of pixel values X, Y, Z indicative of three interpolated pixels, the interpolated pixel value X being indicative of an interpolated pixel disposed between a pixel in a second row and a second column of the array and a pixel in the second row and the third column of the array, the interpolated pixel value Y being indicative of an interpolated pixel disposed between the pixel in the second row and the second column of the array and a pixel in a third row and the second column of the array, and the interpolated pixel value Z being indicative of an interpolated pixel disposed between the pixel in the second row and the second column of the array and a pixel in the third row and the third column of the array.

2. The method of claim 1 further comprising the steps of:
classifying the image content of a second portion of the image by processing a second portion of the image data representative of the second portion of the image;
selecting a type of interpolation from a group including linear interpolation and non-linear interpolation in response to the step of classifying the image content of the second portion of the image; and
using the selected type of interpolation to generate interpolated pixel data representative of an interpolated pixel adjacent at least one of the pixels in the second portion of the image.

3. The method of claim 2 further comprising the step of selecting the second portion of the image to be overlapping with the first portion of the image.

4. The method of claim 1 further including the steps of:
dividing the image into a plurality of overlapping portions;
performing the steps of classifying the image content, selecting a type of interpolation, and using the selected type of interpolation, for at least a majority of the plurality of overlapping portions of the image.

5. The method of claim 1 wherein the step of selecting a type of interpolation includes the step of selecting a type of interpolation from a group including polynomial interpolation, and at least one of median interpolation and modal interpolation.

6. The method of claim 1, wherein the step of using the selected type of interpolation to generate interpolated pixel data includes the steps of:
selecting a pixel;
interpolating a first pixel offset in a first direction from the selected pixel using linear interpolation along a line including the first direction; and
interpolating a second pixel offset in a second direction from the selected pixel using linear interpolation along a line including the second direction.

7. The method of claim 1 wherein the step of classifying the image content of the first portion of the image further comprises the step of determining whether the image content of the first portion of the image includes an edge and less than a specified measure of correlation along a predetermined line, and the step of selecting a type of interpolation includes the step of selecting non-linear interpolation to interpolate a pixel disposed on the line, in cases where it has been determined that the image content of the first portion of the image includes an edge and less than the specified measure of correlation along the line.

8. The method of claim 7 wherein the step of determining whether the image content of the first portion of the image includes an edge extending from a side of the first portion of the image to an opposite side of the first portion of the image.

9. The method of claim 1 wherein the step of classifying the image content of the first portion of the image further comprises the step of determining whether the image content of the first portion of the image has at least a specified measure of correlation along a predetermined line and the step of selecting a type of interpolation includes the step of selecting linear interpolation along the predetermined line to interpolate a pixel disposed on the line in cases where it has been determined that the image content of the first portion of the image has at least the specified measure of correlation along the line.

10. The method of claim 7 wherein the step of classifying the image content of the first portion of the image further comprises the step of determining whether the image content of the first portion of the image has at least a specified measure of correlation along a predetermined line and the step of selecting a type of interpolation includes the step of selecting linear interpolation along the predetermined line to interpolate a pixel disposed on the line in cases where it has been determined that the image content of the first portion of the image has at least the specified measure of correlation along the line.

11. The method of claim 1 wherein the first portion of the image data comprises a plurality of pixel values each representative of an associated one of the pixels in the image, and the step of classifying the image content of the first portion of the image includes the steps of:
calculating a reference value from the plurality of pixel values;
determining, for each of the pixel values, data indicative of whether the pixel value is in a range of values including the reference value, greater than the range of values including the reference value, or less than the range of values including the reference value; and
using the data to determine whether the first portion of the image includes an edge and at least the specified measure of correlation along the line.

12. A method of processing an image comprising the steps of;
receiving image data representative of pixels in an image;
classifying the image content of a first portion of the image based on a first portion of the image data representative of pixels in the first portion of the image;
selecting a type of interpolation from a group including linear interpolation and non-linear interpolation in response to the step of classifying the image content of the first portion of the image; and
using the selected type of interpolation to generate interpolated pixel data representative of an interpolated pixel adjacent at least one of the pixels in the first portion of the image;
wherein the first portion of the image data comprises a plurality of pixel values each representative of an associated one of the pixels in the image, the plurality of pixel values comprising a number of different values, the step of classifying includes the step of determining whether the number of different values is no greater than a threshold value that is no greater than twenty percent of a total number of the pixel values, and the step of selecting a type of interpolation includes the step of selecting a non-linear type of interpolation in cases where it has been determined that the number of different values is no more than the threshold value.

13. The method of claim 12 wherein the step of processing includes the step of specifying a threshold value that is less than three.

14. A method for use in generating an enlargement of an image having pixels disposed in a plurality of rows and columns, a pixel $p_{ij}$ being disposed in a row i, and a column j of the image, the method comprising the steps of:
   a) receiving pixel values each representative of an associated one of the pixels of the image, a pixel value $x_{ij}$ being representative of the pixel $p_{ij}$ in the row i, and the column j of the image;
   b) dividing the pixel values into a plurality of overlapping portions each representative of pixels in an associated portion of the image;
   c) defining a processing window comprising a first one of the overlapping portions of the pixel values associated with an array of pixels of the image, the array comprising N rows and M columns of the pixels in the image, N and M each having a magnitude of at least four, the portion of the pixel values comprising a number of different values;
   d) determining whether the number of different values is no more than a threshold value having a magnitude no greater than twenty percent of a count of the pixel values;
   e) generating, in cases where it has been determined that the number of different values is no more than the threshold value, at least one interpolated pixel value from the portion of pixel values using at least one of median filtering and modal filtering;
   f) determining, at least in other cases, whether the array of pixels in the image has an edge and at least a specified measure of correlation along a predetermined line;
   g) using polynomial filtering in at least one direction, to generate, at least in cases where the array of pixels does not have an edge, at least one interpolated pixel value from the portion of pixel values;
   h) determining at least in cases where the portion of the image has an edge, whether the image content of the first portion of the image has correlation in a predetermined direction;
   i) generating, in cases where it has been determined that the portion of the image has an edge but does not have at least the specified measure of correlation along the line, at least one interpolated pixel value from the portion of pixel values using non-linear filtering;
   j) generating, in cases where it has been determined that the portion of the image has at least the specified measure of correlation along the line, at least one interpolated pixel value from the portion of pixel values using linear filtering; and
   k) repeating the steps of c) through j) for a second one of the plurality of overlapping portions of image data.

15. A method of processing an image comprising the steps of;
   receiving image data representative of pixels in an image;
   receiving data indicative of a classification of a first portion of the image based on a first portion of the image data representative of pixels in the first portion of the image; selecting a type of interpolation from a group including linear interpolation and non-linear interpolation in response to the data indicative of the classification of the first portion of the image; and
   using the selected type of interpolation to generate interpolated pixel data representative of an interpolated pixel adjacent at least one of the pixels in the first portion of the image;
   wherein classification of the image content of a first portion of the image includes defining a processing window representative of an array of the pixels in the image, the array having N rows and M columns, wherein N and M each have a magnitude of at least four,
   wherein the step of using the selected type of interpolation to generate interpolated pixel data includes generating at least one of pixel values X, Y, Z indicative of three interpolated pixels, the interpolated pixel value X being indicative of an interpolated pixel disposed between a pixel in a second row and a second column of the array and a pixel in the second row and the third column of the array, the interpolated pixel value Y being indicative of an interpolated pixel disposed between the pixel in the second row and the second column of the array and a pixel in a third row and the second column of the array, and the interpolated pixel value Z being indicative of an interpolated pixel disposed between the pixel in the second row and the second column of the array and a pixel in the third row and the third column of the array.

16. An apparatus for processing an image, the apparatus comprising:
   means for receiving image data representative of pixels in an image;
   means for classifying the image content of a first portion of the image based on a first portion of the image data representative of pixels in the first portion of the image;
   means for selecting a type of interpolation from a group including linear interpolation and non-linear interpolation in response to the step of classifying the image content of the first portion of the image; and
   means for using the selected type of interpolation to generate interpolated pixel data representative of an interpolated pixel adjacent at least one of the pixels in the first portion of the image;
   wherein the means for classifying defines a processing window representative of an array of the pixels in the image, the array having N rows and M columns, wherein N and M each have a magnitude of at least four,
   wherein the means for using the selected type of interpolation to generate interpolated pixel data generates at least one of pixel values X, Y, Z indicative of three interpolated pixels, the interpolated pixel value X being indicative of an interpolated pixel disposed between a pixel in a second row and a second column of the array and a pixel in the second row and the third column of the array, the interpolated pixel value Y being indicative of an interpolated pixel disposed between the pixel in the second row and the second column of the array and a pixel in a third row and the second column of the array, and the interpolated pixel value Z being indicative of an interpolated pixel disposed between the pixel in the second row and the second column of the array and a pixel in the third row and the third column of the array.

17. An apparatus for processing an image, the apparatus comprising:
   a selector having an input to receive image data representative of pixels in an image and an output to provide data representative of pixels in a first portion of the image;

a classifier having an input to receive the data representative of pixels in the first portion of the image and an output to data indicative of the image content of the first portion of the image;

an adaptive interpolator having an input to receive the data indicative of the image content of the first portion of the image, and having an output to provide interpolated pixel data representative of an interpolated pixel adjacent at least one of the pixels in the first portion of the image, the interpolated pixel data being generated in accordance with a type of interpolation selected from a group including linear interpolation and non-linear interpolation in response to the data indicative of the image content of the first portion of the image;

wherein the classifier defines a processing window representative of an array of the pixels in the image, the array having N rows and M columns, wherein N and M each have a magnitude of at least four, wherein the adaptive interpolator generates at least one of pixel values X, Y, Z indicative of three interpolated pixels, the interpolated pixel value X being indicative of an interpolated pixel disposed between a pixel in a second row and a second column of the array and a pixel in the second row and the third column of the array, the interpolated pixel value Y being indicative of an interpolated pixel disposed between the pixel in the second row and the second column of the array and a pixel in a third row and the second column of the array, and the interpolated pixel value Z being indicative of an interpolated pixel disposed between the pixel in the second row and the second column of the array and a pixel in the third row and the third column of the array.

* * * * *